US012110740B2

(12) United States Patent
Huang

(10) Patent No.: US 12,110,740 B2
(45) Date of Patent: Oct. 8, 2024

(54) FASTENING SYSTEM AND WINDOW SHADE INCLUDING THE SAME

(71) Applicant: Teh Yor Co., Ltd., New Taipei (TW)

(72) Inventor: Chien-Fong Huang, City of Industry, CA (US)

(73) Assignee: Teh Yor Co., Ltd., New Taipei (TW)

( * ) Notice: Subject to any disclaimer, the term of this patent is extended or adjusted under 35 U.S.C. 154(b) by 79 days.

(21) Appl. No.: 18/049,934

(22) Filed: Oct. 26, 2022

(65) Prior Publication Data

US 2023/0132417 A1 May 4, 2023

Related U.S. Application Data

(60) Provisional application No. 63/274,535, filed on Nov. 2, 2021.

(51) Int. Cl.
*E06B 9/38* (2006.01)
*E06B 9/36* (2006.01)
*A47H 13/01* (2006.01)

(52) U.S. Cl.
CPC ................ *E06B 9/365* (2013.01); *E06B 9/38* (2013.01); *A47H 13/01* (2013.01)

(58) Field of Classification Search
CPC . E06B 9/36; E06B 9/362; E06B 9/364; E06B 9/365; E06B 9/367; A47H 13/00; A47H 13/01; A47H 13/06; A47H 13/14
See application file for complete search history.

(56) References Cited

U.S. PATENT DOCUMENTS 4,291,738 A * 9/1981 Grenga .................. E06B 9/367 160/176.1 R
4,356,855 A * 11/1982 Holzer .................. E06B 9/367 160/178.1 R
6,050,322 A * 4/2000 Finkelstein ............ A47H 13/00 160/184

(Continued)

FOREIGN PATENT DOCUMENTS

CN 217610473 U 10/2022
TW I692574 B 5/2020

OTHER PUBLICATIONS

International Search Report in the relatedPCT application No. PCT/US2022/047907, dated Feb. 13, 2023.

(Continued)

*Primary Examiner* — Johnnie A. Shablack
(74) *Attorney, Agent, or Firm* — Chen Yoshimura LLP

(57) ABSTRACT

A fastening system for a window shade includes a first clipping element having a first latching part, and a second clipping element having a second latching part operable to engage with the first latching part for attaching the first and second clipping element to each other, the first and second clipping element being attachable to each other for holding at least one panel of a window shade in a gap between the first and second clipping element. The first and second clipping element are attachable to each other according to a first and a second configuration, the gap between the first and second clipping element being greater in the first configuration than in the second configuration. The fastening system can hold two panels in contact with each other in the gap in the first configuration, and to hold a single panel in the gap in the second configuration.

19 Claims, 9 Drawing Sheets

(56) References Cited

U.S. PATENT DOCUMENTS

| | | | | |
|---|---|---|---|---|
| 6,330,900 | B1 * | 12/2001 | Welfonder | E06B 9/36<br>160/177 V |
| 6,659,154 | B2 * | 12/2003 | Bergeron | E06B 9/36<br>160/38 |
| 6,941,999 | B2 * | 9/2005 | Paterni | E06B 3/80<br>160/184 |
| 8,307,499 | B2 * | 11/2012 | Ruffo | A47H 13/00<br>160/178.1 V |
| 11,187,031 | B2 * | 11/2021 | Huang | E06B 9/36 |
| 2003/0217446 | A1 * | 11/2003 | Hamlin | A47K 3/38<br>24/716 |
| 2007/0267153 | A1 * | 11/2007 | Hardy | E06B 9/367<br>160/168.1 V |
| 2008/0236766 | A1 * | 10/2008 | Vandervoort | B29C 66/73116<br>160/172 V |
| 2017/0354285 | A1 * | 12/2017 | Kim | E06B 9/364 |
| 2019/0376338 | A1 | 12/2019 | Huang | |
| 2020/0032580 | A1 * | 1/2020 | Strand | E06B 9/386 |
| 2020/0308733 | A1 * | 10/2020 | Byun | E06B 9/362 |
| 2022/0049544 | A1 | 2/2022 | Schulman | |
| 2023/0003082 | A1 * | 1/2023 | Albertini | E06B 9/367 |
| 2023/0046453 | A1 * | 2/2023 | Williams | A47H 13/01 |

OTHER PUBLICATIONS

Written Opinion in the related PCT application No. PCT/US2022/047907, dated Feb. 13, 2023.

Taiwanese Office Action, dated Feb. 13, 2023, in a counterpart Taiwanese patent application, No. TW 111141358. (English translation of the search report).

* cited by examiner

FASTENING SYSTEM AND WINDOW SHADE INCLUDING THE SAME

CROSS-REFERENCE TO RELATED APPLICATION(S)

This application claims priority to U.S. provisional patent application No. 63/274,535 filed on Nov. 2, 2021, the disclosure of which is incorporated herein by reference.

BACKGROUND

1. Field of the Invention

The present invention relates to window shades including vertical panels, and fastening systems used in the window shades.

2. Description of the Related Art

Some existing window shades include a plurality of panels made of a fabric material that vertically hang from a head rail. The panels are conventionally attached to hangers, which are movably assembled with the head rail. The hangers can slide along the head rail and rotate so that the panels can be displaced horizontally or rotated to control an amount of light entering a room.

For attaching the panels to the hangers, fasteners are usually provided at the top of the panels. Each fastener may clip a panel and attach to one hanger, e.g., by having a hook of the hanger engaging a hole provided on the fastener. In practice, the conventional fasteners may have some disadvantages. For example, the fasteners may not suitably hold the panels, cause tearing of the panels, and/or do not provide a flexible use. Moreover, some conventional fasteners may keep the panels distant from a lower edge of the head rail, which may cause light leakage between the head rail and the panels.

Therefore, there is a need for an improved fastening system that can be conveniently used in window shades and address at least the foregoing issues.

SUMMARY

The present application describes a fastening system for a window shade, and a window shade using the fastening system.

According to an embodiment, a fastening system for a window shade includes a first clipping element having a first latching part, and a second clipping element having a second latching part operable to engage with the first latching part for attaching the first and second clipping element to each other, the first and second clipping element being attachable to each other for holding at least one panel of a window shade in a gap between the first and second clipping element. The first and second clipping element are attachable to each other according to a first and a second configuration, the gap between the first and second clipping element being greater in the first configuration than in the second configuration. The fastening system is adapted to hold two panels of a window shade in contact with each other in the gap between the first and second clipping element in the first configuration, and to hold a single panel of a window shade in the gap between the first and second clipping element in the second configuration.

Moreover, the present application provides a window shade including a first vertical panel, a second vertical panel, an outmost vertical panel and the fastening system, wherein the fastening system is disposed to either hold the first vertical panel and the second vertical panel adjacent to each other or to hold an outer side portion of the outmost vertical panel.

DETAILED DESCRIPTION OF THE EMBODIMENTS

Figure 1:
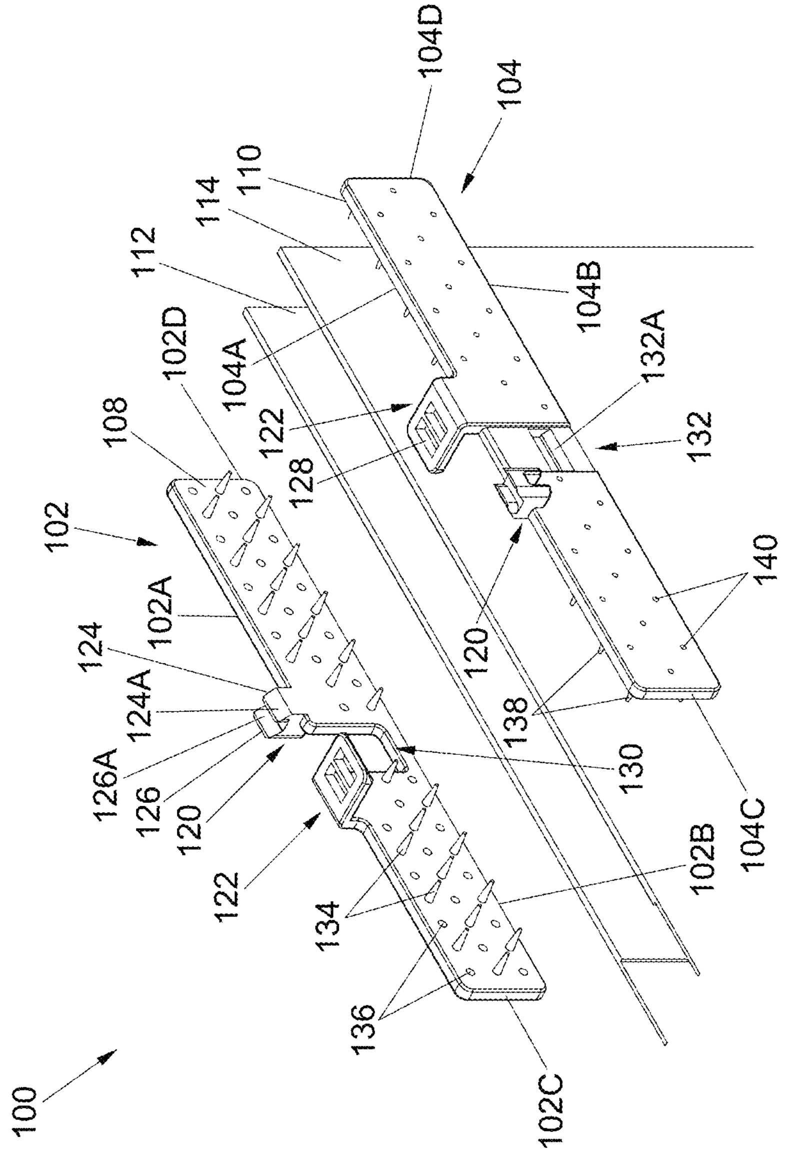
FIG. 1 is an exploded view illustrating an embodiment of a fastening system suitable for use with a window shade, the fastening system being shown in a first configuration adapted to hold two panels of a window shade.
Figure 2:
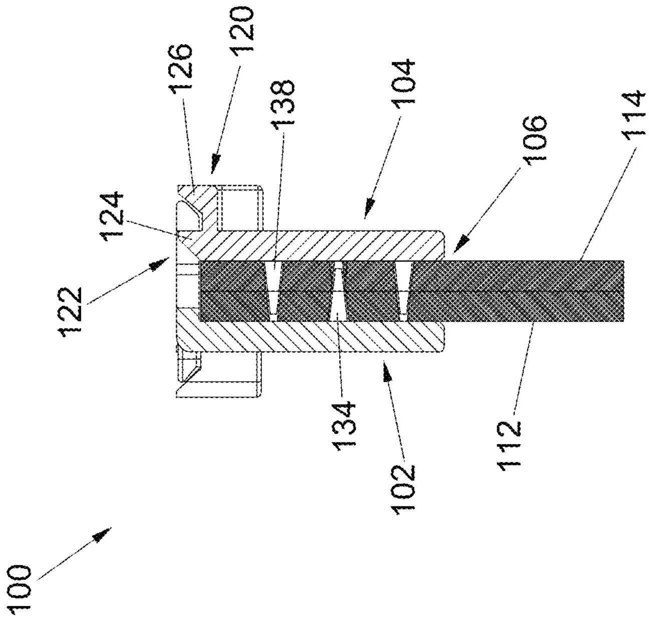
FIG. 2 is a cross-sectional view illustrating the fastening system in the first configuration.

FIG. 1 is an exploded view illustrating an embodiment of a fastening system 100 suitable for use with a window shade, and FIG. 2 is a cross-sectional view illustrating the fastening system 100. Referring to FIGS. 1 and 2, the fastening system 100 includes two clipping elements 102 and 104. Each of the two clipping elements 102 and 104 can be formed as a single piece. Examples of suitable materials for making the clipping elements 102 and 104 may include, without limitation, plastic materials. The two clipping elements 102 and 104 are attachable to each other for holding at least one panel of a window shade in a gap 106 between the two clipping elements 102 and 104. The gap 106 may be defined between an inner surface 108 of the clipping element 102 and an inner surface 110 of the clipping element 104 that face each other when the clipping element 102 is attached to the clipping element 104.

According to an example of construction, the two clipping elements 102 and 104 can have similar outer shape boundaries that can match each other when the clipping elements 102 and 104 are attached to each other. For example, each of the two clipping elements 102 and 104 may correspondingly have two opposite outer edges of a greater length (i.e., outer edges 102A and 102B for the clipping element 102 and outer edges 104A and 104B for the clipping element 104), and two opposite outer edges of a shorter length (i.e., outer edges 102C and 102D for the clipping element 102 and outer edges 104C and 104D for the clipping element 104), each of the two outer edges of the shorter length being respectively connected to the two outer edges of the greater length.

The clipping element 102 is attachable to the clipping element 104 according to at least a first and a second configuration, the gap 106 between the two clipping elements 102 and 104 being greater in the first configuration than in the second configuration. FIGS. 1 and 2 illustrate the fastening system 100 used in the first configuration. In the first configuration, the fastening system 100 is adapted to hold two panels 112 and 114 of a window shade in contact with each other in the gap 106 between the two clipping elements 102 and 104. The two panels 112 and 114 held by the fastening system 100 can respectively contact with the two clipping elements 102 and 104. Moreover, each of the two panels 112 and 114 held by the fastening system 100 can have a top edge that is positioned adjacent to the outer edges 102A and 104A of the two clipping elements 102 and 104 and extends along the outer edges 102A and 104A.

Figure 3:
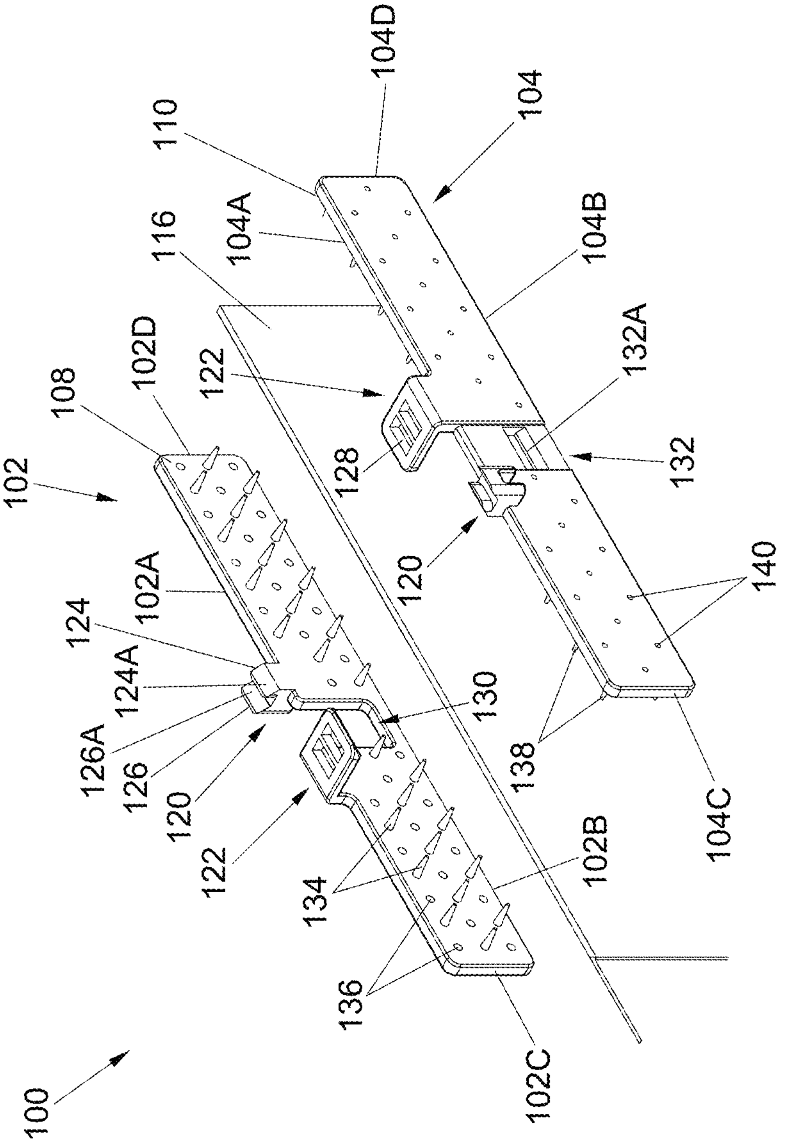
FIG. 3 is an exploded view illustrating the fastening system in a second configuration adapted to hold a single panel of a window shade.
Figure 4:
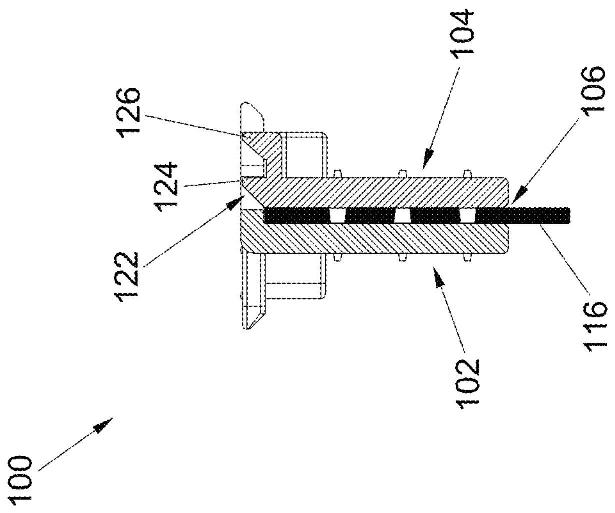
FIG. 4 is a cross-sectional view illustrating the fastening system in the second configuration.
Figure 5:
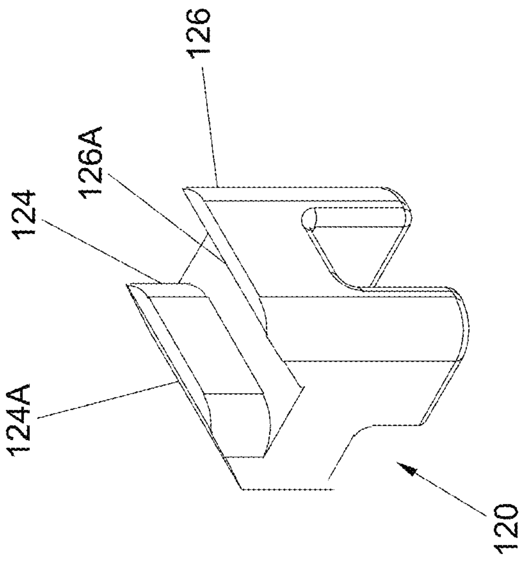
FIG. 5 is an enlarged view illustrating a latching portion provided in the fastening system.
Figure 6:
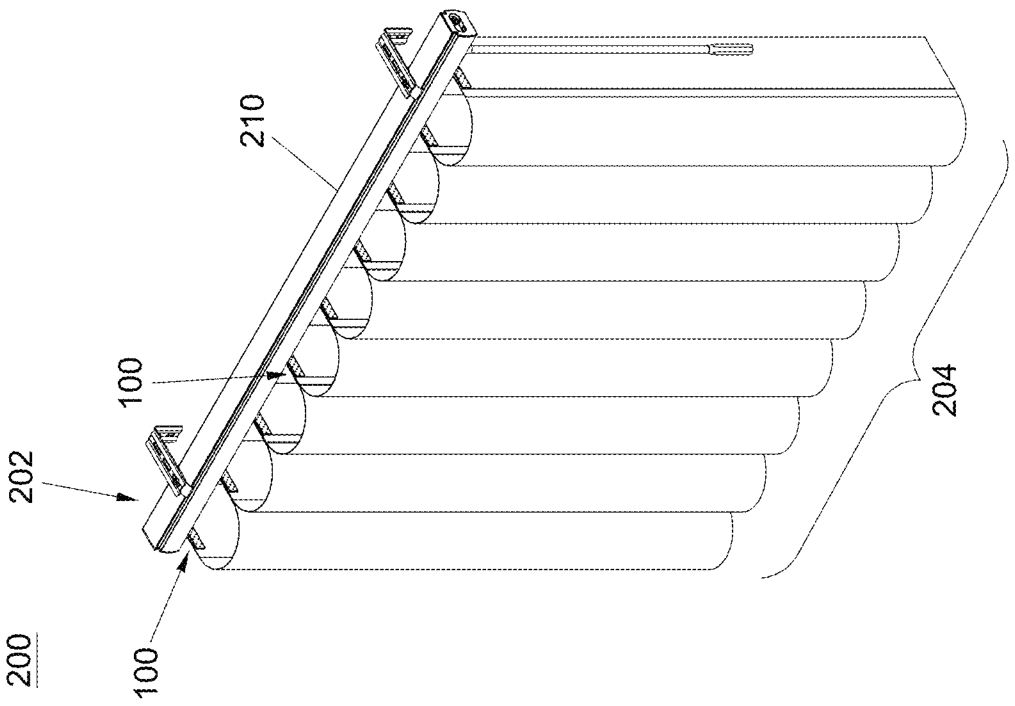
FIG. 6 is a perspective view illustrating an embodiment of a window shade including a plurality of vertical panels.
Figure 7:
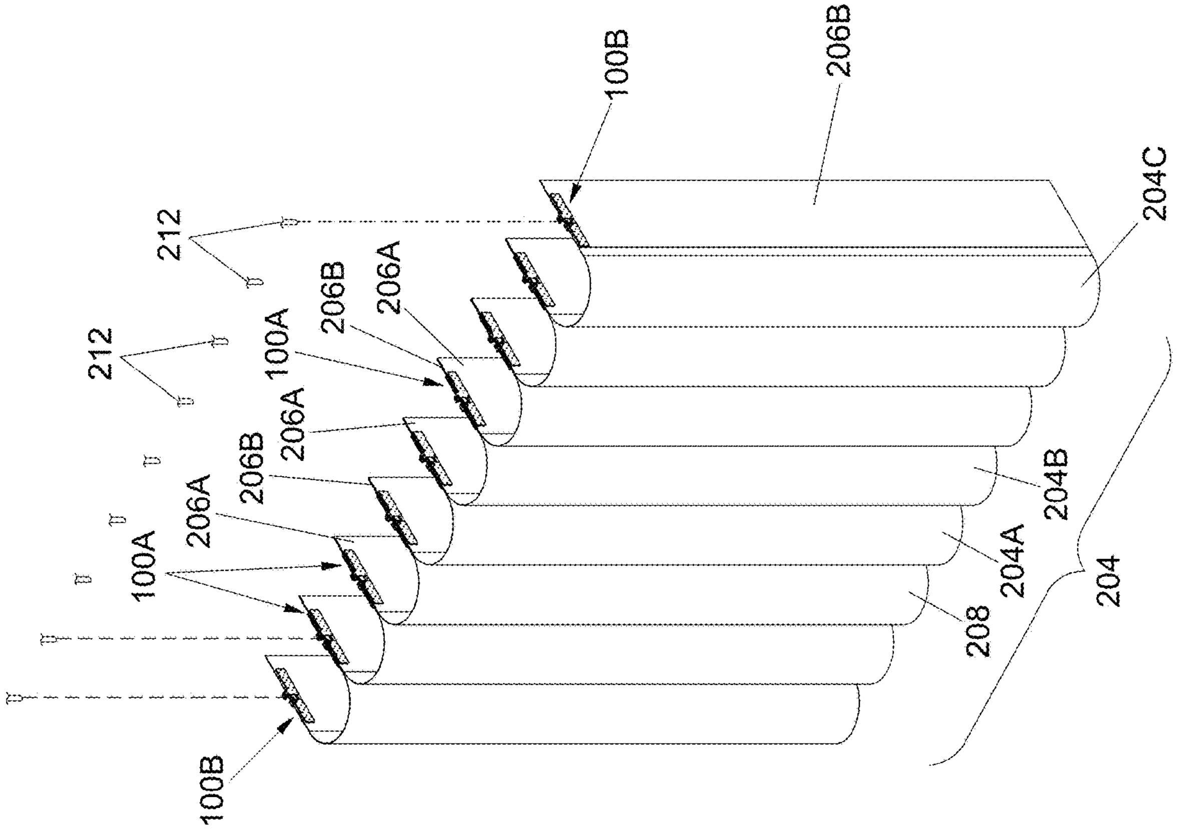
FIG. 7 is a perspective view illustrating the use of the fastening system for attaching the vertical panels.
Figure 8:
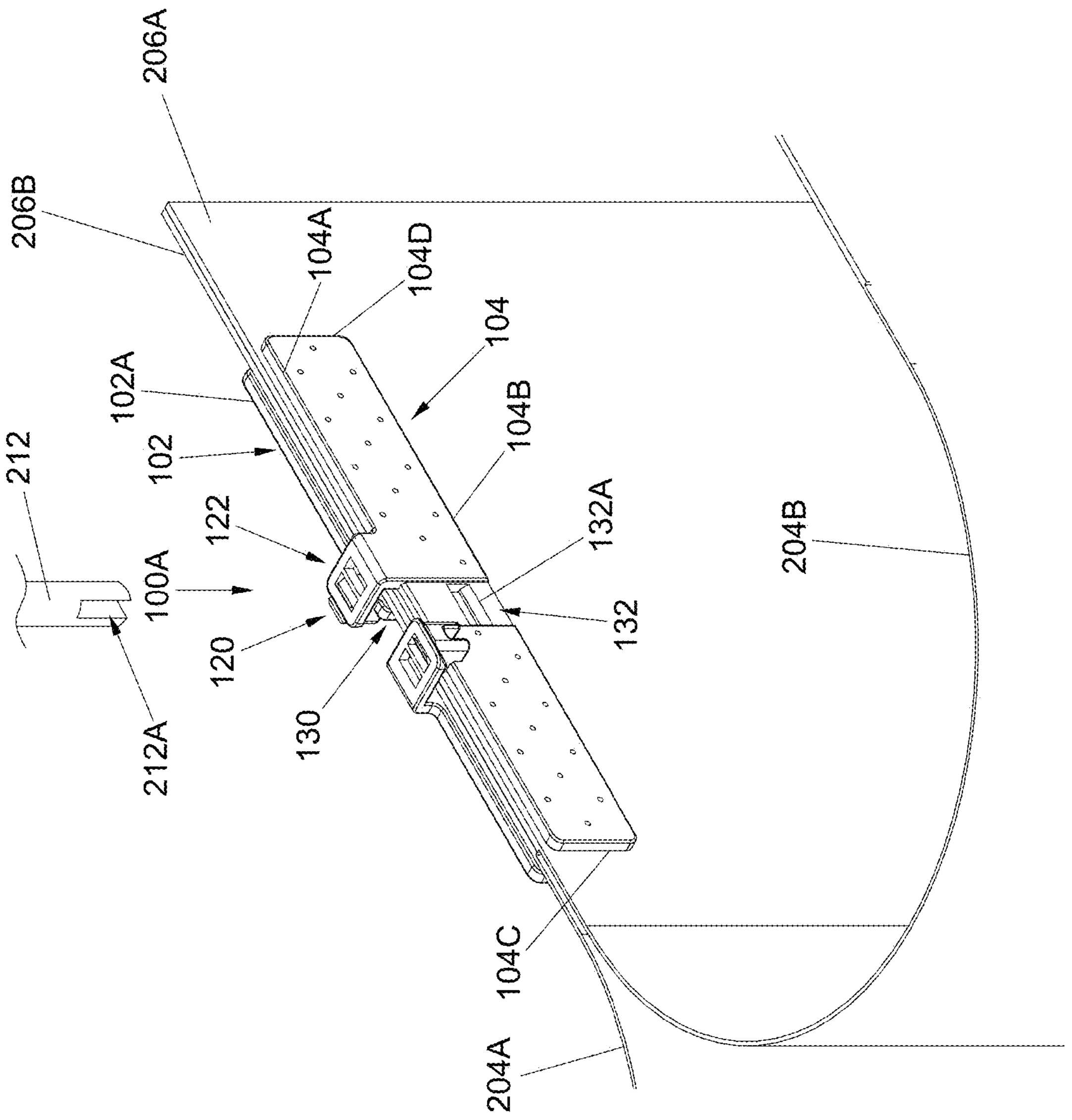
FIG. 8 is an enlarged perspective view illustrating the assembly of the fastening system for attaching two adjacent vertical panels.
Figure 9:
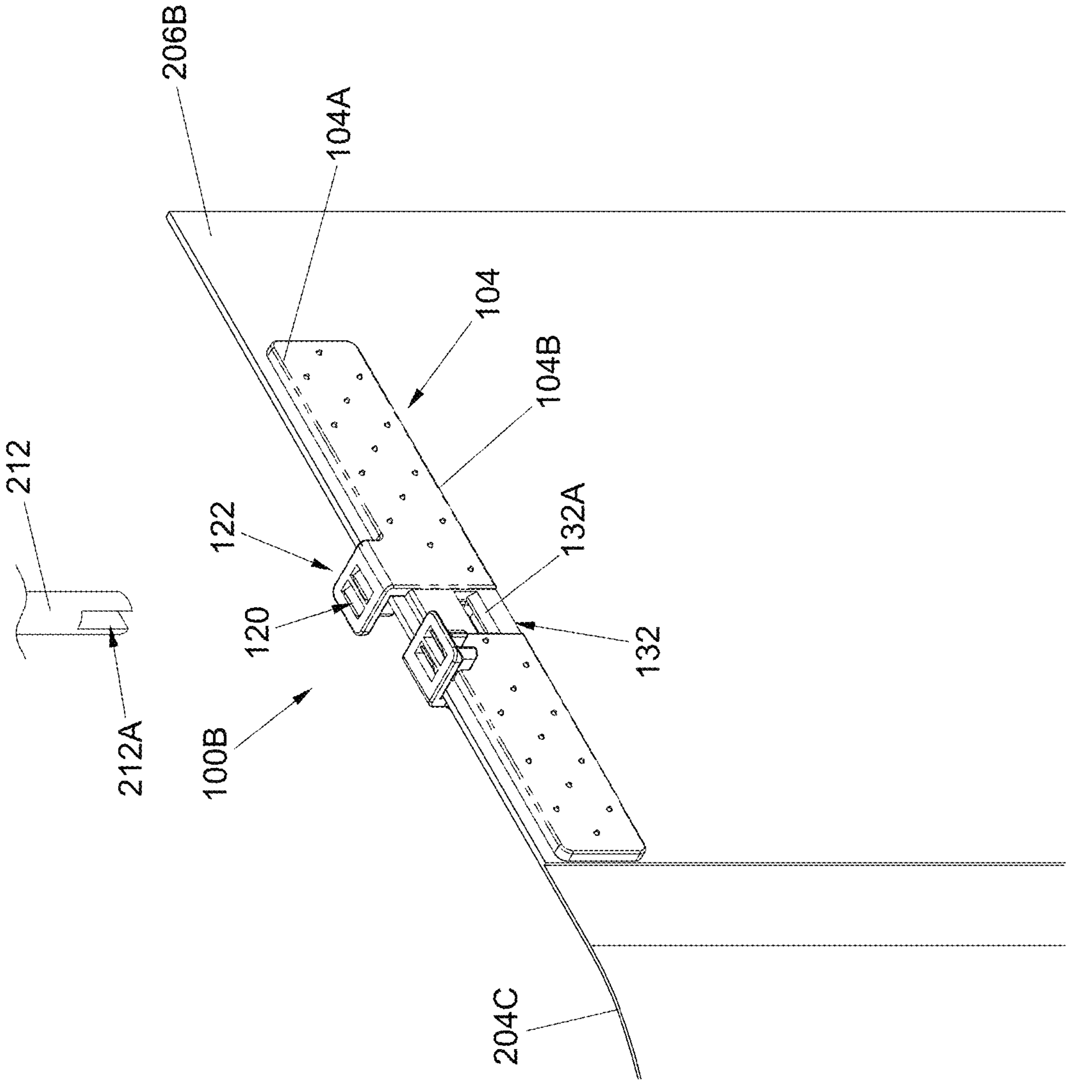
FIG. 9 is an enlarged perspective view illustrating the assembly of the fastening system for attaching an outer side portion of an outmost vertical panel.

FIGS. 3 and 4 illustrate the fastening system 100 used in the second configuration. In the second configuration, the fastening system 100 is adapted to hold a single panel 116 of a window shade in the gap 106 between the two clipping elements 102 and 104. The single panel 116 held by the fastening system 100 can respectively contact with the two clipping elements 102 and 104 at two opposite sides. Moreover, the single panel 116 held by the fastening system 100 can have a top edge that is positioned adjacent to the outer edges 102A and 104A of the two clipping elements 102 and 104 and extends along the outer edges 102A and 104A.

Referring to FIGS. 1-4, the clipping element 102 has a latching part 120, and the clipping element 104 has a latching part 122. The latching part 122 is operable to engage with the latching part 120 for attaching the clipping element 104 to the clipping element 102 in any of the aforementioned first and second configuration. According to an example of construction, the latching part 120 can be fixedly connected to the clipping element 102, and the latching part 122 can be fixedly connected to the clipping element 104. For example, the latching part 120 can be formed integrally with the clipping element 102, and the latching part 122 can be formed integrally with the clipping element 104. According to an example of construction, the latching part 120 can protrude from the outer edge 102A of the clipping element 102, and the latching part 122 can protrude from the outer edge 104A of the clipping element 104. When the two clipping elements 102 and 104 are attached to each other for holding one or more panel of a window shade, the two latching parts 120 and 122 can engage with each other above a top edge of the one or more panel.

The latching parts 120 and 122 may have any suitable constructions allowing attachment of the two clipping elements 102 and 104 with the gap 106 set to a desirable size. According to an example of construction, the latching part 120 can have two engagement portions 124 and 126, and the latching part 122 can engage with any of the two engagement portions 124 and 126 for attaching the two clipping elements 102 and 104. The latching part 120 including the two engagement portions 124 and 126 may be exemplarily formed integrally with the clipping element 102. The latching part 122 can engage with the engagement portion 124 for attaching the clipping element 102 to the clipping element 104 in the first configuration (i.e., with the gap 106 having a greater size), and can engage with the engagement portion 126 for attaching the clipping element 102 to the clipping element 104 in the second configuration (i.e., with the gap 106 having a smaller size). The two engagement portions 124 and 126 can be spaced apart from each other along a direction that is transversal to the gap 106 and orthogonal to the inner surface 108 of the clipping element 102 and the inner surface 110 of the clipping element 104. According to an example of construction, the engagement portions 124 and 126 can include protrusions, and the latching part 122 can include one or more slot 128 adapted to engage with any of the engagement portions 124 and 126.

According to an example of construction, the latching part 122 can engage with any of the engagement portions 124 and 126 of the latching part 120 through a snap-fit method. For facilitating the engagement of the latching part 122, each of the two engagement portions 124 and 126 can have a ramp surface, e.g., ramp surface 124A for the engagement portion 124 and ramp surface 126A for the engagement portion 126. As the two clipping elements 102 and 104 move toward each other for connection, the latching part 122 can come in sliding contact with the ramp surface 124A or 126A, which causes the latching part 122 to elastically deflect sideways relative to the direction of relative movement between the clipping elements 102 and 104 until the slot 128 is aligned with the engagement portion 124 or 126 and the latching part 122 can elastically move back and engage with the engagement portion 124 or 126.

It will be understood that each of the two clipping elements 102 and 104 may include any suitable numbers of the latching parts 120 and 122 to ensure proper attachment. In the illustrated embodiment, each of the two clipping elements 102 and 104 is exemplarily shown as including one latching part 120 and one latching part 122. In other embodiments, one of the two clipping elements 102 and 104 may have one, two or more of the same latching part 120, and the other one of the two clipping elements 102 and 104 may have one, two or more of the same latching part 122.

Referring to FIGS. 1-4, the clipping element 102 can have a notch 130 open on the outer edge 102A thereof and extending into the inner surface 108, and the clipping element 104 can correspondingly have a hanger engaging portion 132 for attachment of the fastening system 100 to a hanger provided in a head frame of a window shade. According to an example of construction, the hanger engaging portion 132 may include a slot 132A configured to engage with a protrusion provided on the hanger of the head frame. When the clipping elements 102 and 104 are attached to each other, the notch 130 can overlap with the hanger engaging portion 132 across the gap 106. Accordingly, the two clipping elements 102 and 104 attached to each other are adapted to hold at least one panel of a window shade in a region of the gap 106 overlapping with the notch 130 and the hanger engaging portion 132.

According to an example of construction, the latching parts 120 and 122 may be provided at two opposite sides of the region of the notch 130 and the hanger engaging portion 132 for a balanced weight distribution. For example, the illustrated embodiment has the latching parts 120 and 122 disposed adjacent to the notch 130 and the hanger engaging portion 132 at two opposite sides thereof. It will be appreciated, however, that other placements of the latching parts 120 and 122 along the outer edges 102A and 104A of the clipping elements 102 and 104 may be possible.

Referring to FIGS. 1-4, the inner surface 108 of the clipping element 102 can have a plurality of protruding teeth 134 and a plurality of openings 136, the protruding teeth 134 and the openings 136 being distributed at two opposite sides of the notch 130. The inner surface 110 of the clipping element 104 can likewise have a plurality of protruding teeth 138 and a plurality of openings 140, the protruding teeth 138 and the openings 140 being distributed at two opposite sides of the hanger engaging portion 132. The protruding teeth 134 and 138 are adapted to pierce one or more panel of a window shade held in the gap 106 between the two clipping elements 102 and 104, the openings 136 in the clipping element 102 being adapted to respectively receive at least partially the protruding teeth 138 of the clipping element 104, and the openings 140 in the clipping element 104 being adapted to respectively receive at least partially the protruding teeth 134 of the clipping element 102.

In conjunction with FIGS. 1-5, FIGS. 6-9 are schematic views illustrating exemplary use of the fastening system 100 in a window shade 200. Referring to FIGS. 6-9, the window shade 200 can include a head frame 202 and a plurality of vertical panels 204. The head frame 202 may be affixed at a top of a window frame, and may have an elongate shape.

Each vertical panel 204 can be made of a flexible material including, but not limited to, a fabric material, a web material, a mesh material, and the like. Each vertical panel 204 can include two side portions 206A and 206B, and a central portion 208 between the two side portions 206A and 206B. According to an embodiment, the two side portions 206A and 206B and the central portion 208 may have different light transmissivities. For example, the light transmissivity of the central portion 208 may be higher than that of each side portion 206A and 206B. Each vertical panel 204 can have generally U-shape when it is connected to the head frame 202.

Referring to FIGS. 1-9, multiple fastening systems 100 as described previously can be used to attach the vertical panels 204 adjacently to one another and to hang the vertical panels 204 below the head frame 202. More specifically, the fastening systems 100 can include fastening systems 100A in the first configuration described previously, and fastening systems 100B in the second configuration described previously. The fastening systems 100A and 100B can be respectively connected to the head frame 202 for hanging the vertical panels 204. For example, the head frame 202 can include a head rail 210, and a plurality of hangers 212 that are movably connected to the head rail 210 and can respectively engage with the hanger engaging portions 132 of the fastening systems 100A and 100B. According to an example of construction, each of the hangers 212 can have a slot 212A, and the hanger engaging portion 132 can be inserted into the slot 212A for engaging the hanger 212 with the hanger engaging portion 132. The notches 130 of the fastening systems 100A and 100B can respectively receive at least partially the hangers 212 when the hangers 212 are engaged with the hanger engaging portions 132.

Referring to FIGS. 1-8, each fastening system 100A can be applied for holding two adjacent vertical panels 204 at a top thereof. For example, the vertical panels 204 can include two vertical panels 204A and 204B, and the fastening system 100A can be used to attach one side portion 206B of the vertical panel 204A to one side portion 206A of the other vertical panel 204B so that the two vertical panels 204A and 204B are held adjacent to each other. Once the fastening system 100A is connected to the corresponding hanger 212, the two vertical panels 204A and 204B (in particular the side portion 206B of the vertical panel 204A and the side portion 206A of the vertical panel 204B) held by the fastening system 100A can be at least partially received through the slot 212A of the hanger 212. This arrangement allows the vertical panels 204A and 204B to be positioned substantially close to a lower edge of the head rail 210, which can prevent light leakage between the head rail 210 and the vertical panels 204A and 204B.

Referring again to FIGS. 6-9, the vertical panels 204 can further include an outmost vertical panel 204C having an outer side portion 206B not attached to any other vertical panel. The fastening system 100B can be used for holding the outer side portion 206B of the outmost vertical panel 204C, the top of the outer side portion 206B being held between the two clipping elements 102 and 104 of the fastening system 100B. Once the fastening system 100B is connected to the corresponding hanger 212, the outer side portion 206B of the outmost vertical panel 204C held by the fastening system 100B can be at least partially received through the slot 212A of the hanger 212. This arrangement allows the outmost vertical panel 204C to be positioned substantially close to the lower edge of the head rail 210, which can prevent light leakage between the head rail 210 and the outmost vertical panel 204C.

The fastening system described herein is relatively simple in construction, and can be used to conveniently attach vertical panels of a window shade. The fastening system has multiple configurations that allow attachments of adjacent vertical panels as well as outer side portions of outmost vertical panels. Moreover, the vertical panels can be positioned substantially close to the lower edge of the head rail, which can prevent light leakage between the head rail and the vertical panels.

Realizations of the structures have been described only in the context of particular embodiments. These embodiments are meant to be illustrative and not limiting. Many variations, modifications, additions, and improvements are possible. Accordingly, plural instances may be provided for components described herein as a single instance. Structures and functionality presented as discrete components in the exemplary configurations may be implemented as a combined structure or component. These and other variations, modifications, additions, and improvements may fall within the scope of the claims that follow.

What is claimed is:

1. A fastening system for a window shade, comprising:

a first clipping element having a first latching part, wherein the first latching part is a protruding structure that is provided at a first location on the first clipping element and has a first engagement portion and a second engagement portion; and a second clipping element having a second latching part operable to engage with the first latching part for attaching the second clipping element to the first clipping element, wherein the second latching part is another protruding structure provided at a second location on the second clipping element, the first and second clipping element being attachable to each other for holding at least one panel of a window shade in a gap between the first and second clipping element;

wherein the first clipping element is attachable to the second clipping element according to a first configuration and a second configuration, the gap between the first clipping element and the second clipping element being greater in the first configuration than in the second configuration, the fastening system being configured to hold two panels of a window shade in contact with each other in the gap between the first clipping element and the second clipping element in the first configuration, and the fastening system being configured to hold a single panel of a window shade in the gap between the first clipping element and the second clipping element in the second configuration; and wherein an engagement of the second latching part with the first engagement portion attaches the first clipping element to the second clipping element in the first configuration, and an engagement of the second latching part with the second engagement portion attaches the first clipping element to the second clipping element in the second configuration.

2. The fastening system according to claim 1, wherein each of the first clipping element and the second clipping element is formed as a single piece.

3. The fastening system according to claim 1, wherein the first latching part is fixedly connected to the first clipping element.

4. The fastening system according to claim 1, wherein the first latching part is formed integrally with the first clipping element, and the second latching part is formed integrally with the second clipping element.

5. The fastening system according to claim 1, wherein the first latching part including the first and second engagement portion is formed integrally with the first clipping element.

6. The fastening system according to claim 1, wherein the first engagement portion and the second engagement portion are spaced apart from each other along a direction transversal to the gap between the first clipping element and the second clipping element.

7. The fastening system according to claim 1, wherein each of the first and second engagement portions has a ramp surface for facilitating an engagement of the second latching part.

8. The fastening system according to claim 1, wherein the first latching part protrudes from a first outer edge of the first clipping element, and the second latching part protrudes from a second outer edge of the second clipping element.

9. The fastening system according to claim 1, wherein the first clipping element has a first inner surface, the second clipping element has a second inner surface, and the first clipping element is attachable to the second clipping element with the first inner surface facing the second inner surface and the gap defined between the first inner surface and the second inner surface.

10. The fastening system according to claim 9, wherein the first clipping element has a notch open on an outer edge thereof and extending into the first inner surface, and the second clipping element has a hanger engaging portion, the notch overlapping with the hanger engaging portion when the first clipping element is attached to the second clipping element.

11. The fastening system according to claim 10, wherein the first and second clipping element attached to each other are adapted to hold at least one panel of a window shade in a region of the gap overlapping with the notch and the hanger engaging portion.

12. The fastening system according to claim 10, wherein one of the first inner surface and the second inner surface has a plurality of protruding teeth adapted to pierce one or more panel of a window shade, and the other one of the first inner surface and the second inner surface has a plurality of openings adapted to respectively receive at least partially the protruding teeth, the protruding teeth and the openings being distributed at two opposite sides of the notch and the hanger engaging portion.

13. The fastening system according to claim 10, wherein the first latching part protrudes from the outer edge of the first clipping element and is adjacent to the notch.

14. A window shade comprising:

a first vertical panel, a second vertical panel and an outmost vertical panel; and the fastening system according to claim 1, the fastening system being disposed to either hold the first vertical panel and the second vertical panel adjacent to each other or to hold an outer side portion of the outmost vertical panel.

15. The window shade according to claim 14, further including a head frame having a hanger provided with a slot, wherein the fastening system is connectible to the hanger with the first and second vertical panel held by the fastening system at least partially received through the slot of the hanger, or the fastening system is connectible to the hanger with the outer side portion of the outmost vertical panel held by the fastening system at least partially received through the slot of the hanger.

16. A fastening system for a window shade, comprising:

a first clipping element having a first latching part, the first latching part being a protruding structure provided at a first location on the first clipping element; and a second clipping element having a hanger engaging portion, and a second latching part operable to engage with the first latching part for attaching the second clipping element to the first clipping element, the second latching part being another protruding structure provided at a second location on the second clipping element, the first and second clipping element being attachable to each other for holding at least one panel of a window shade in a gap between the first and second clipping element, the hanger engaging portion being configured to sideways overlap with the at least one panel when the first and second clipping element are attached to each other with the at least one panel held in the gap between the first and second clipping element.

17. The fastening system according to claim 16, wherein the first clipping element has a notch open on an outer edge thereof, the notch overlapping with the hanger engaging portion when the first clipping element is attached to the second clipping element.

18. The fastening system according to claim 17, wherein the first and second clipping element are adapted to hold the at least one panel with a top edge of the at least one panel positioned adjacent to the outer edge of the first clipping element.

19. The fastening system according to claim 16, wherein the first clipping element is attachable to the second clipping element according to a first configuration and a second configuration, the gap between the first clipping element and the second clipping element being greater in the first configuration than in the second configuration, the fastening system being adapted to hold two panels of a window shade in contact with each other in the gap between the first clipping element and the second clipping element in the first configuration, and the fastening system being adapted to hold a single panel of a window shade in the gap between the first clipping element and the second clipping element in the second configuration.

* * * * *